C. POWELL.
TRACTION WHEEL.
APPLICATION FILED APR. 19, 1915.

1,175,987.

Patented Mar. 21, 1916.

Witnesses

C. Powell, Inventor by Attorneys

UNITED STATES PATENT OFFICE.

CHARLES POWELL, OF GRAY, OKLAHOMA.

TRACTION-WHEEL.

1,175,987.     Specification of Letters Patent.     Patented Mar. 21, 1916.

Application filed April 19, 1915. Serial No. 22,453.

*To all whom it may concern:*

Be it known that I, CHARLES POWELL, a citizen of the United States, residing at Gray, in the county of Beaver and State of Oklahoma, have invented a new and useful Traction-Wheel, of which the following is a specification.

This invention relates to traction wheels for use upon tractors, and other vehicles, one of the objects of the invention being to provide the wheels with cleats or grouters having means whereby the said grouters can be simultaneously projected beyond the rim of the wheel, thus to bite into the soil, or can be simultaneously retracted so as to become inactive.

A further object is to provide means under the control of the operator whereby the grouters on both traction wheels can be actuated in unison.

A further object is to provide traction wheels of novel construction which are durable and to which the grouters are connected in a novel manner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
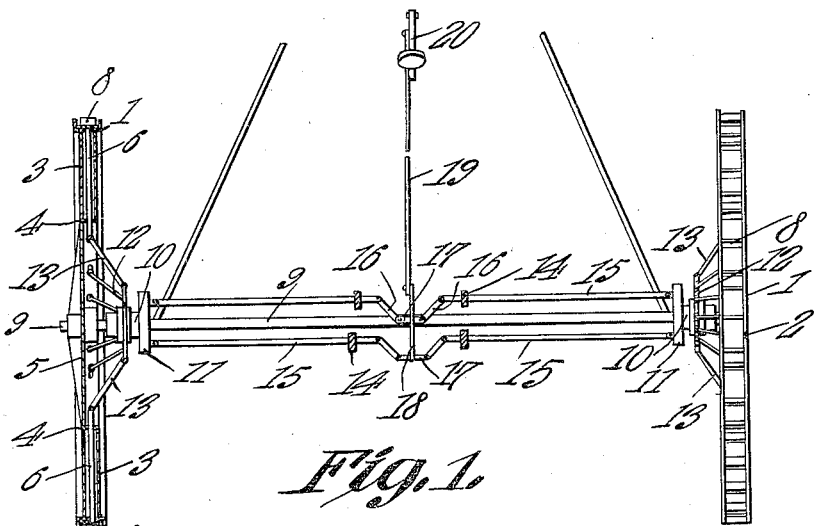
Figure 2:
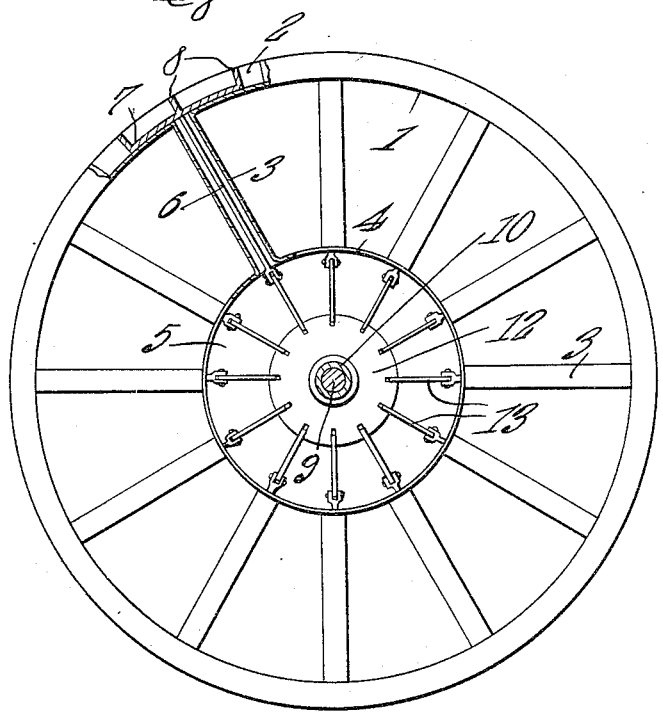
Figure 3:
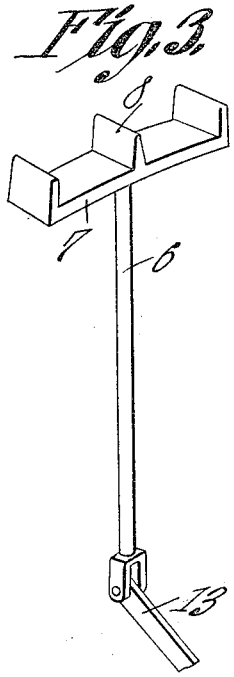

In said drawings:—Figure 1 is a plan view of one traction wheel and a section through another traction wheel of a vehicle, the axle and the operating mechanism being shown in plan. Fig. 2 is a side elevation of one of the wheels, parts being shown in section. Fig. 3 is a perspective view of one of the grouters and adjacent parts.

Referring to the figures by characters of reference 1 designates the rim of the wheel, the same having a peripheral groove 2 while opening into this groove are tubular spokes 3 extending from an annular flange 4 forming the peripheral portion of a hub 5. Slidably mounted within each of the tubular spokes 3 is a stem 6 projecting inwardly from the middle portion of an arcuate plate 7 and extending outwardly from this plate are transverse cleats or grouters 8.

The wheel herein described is mounted on and rotates with an axle 9 and slidably mounted on the axle is a sleeve 10 provided, at its inner end, with a collar 11. A disk 12 is mounted for rotation on the sleeve and is connected, by toggle links 13, to the inner ends of the respective stems 6.

It is to be understood that both of the wheels mounted on the axle 9 are of the same construction, there being a sleeve 10 adjacent each of the wheels.

Mounted within suitable fixed guides 14 are oppositely extending rods 15 and the outer ends of these rods are pivotally connected to the collars 11, while the inner ends thereof are connected by toggle links 16 to cross heads 17 carried by a slide 18. An actuating rod 19 connects the slide 18 to a foot lever 20. Thus it will be seen that when the foot lever is moved in one direction, motion will be transmitted therefrom through the rod 19 to the cross heads 17 with the result that the toggle links 16 will thrust against the rods 15 and cause the collars 11 to push outwardly against the disks 12. This will result in the toggle links 13 thrusting against the stems 6 and pushing the grouters outwardly so that the active edges thereof will be brought to position to bite into the soil and thus increase the tractive force of the wheels. When the lever 20 is moved in the opposite direction, the grouters will be retracted simultaneously.

What is claimed is:—

1. A traction wheel including a hub having a laterally extending peripheral flange, tubular spokes radiating from the flange, a rim at the outer ends of the spokes and having an annular groove, closely lying arcuate plates normally seated upon the inner wall of the groove, each plate having transverse grouters, stems slidably mounted within the respective spokes and fixedly connected at their outer ends to the arcuate plates, a sleeve movable axially of the hub, and toggle links connecting the peripheral portion of the sleeve to the inner ends of the respective stems.

2. The combination with an axle, guides adjacent thereto, sleeves slidably mounted on the axle, rods connected to the sleeves and slidable within the guides, toggles connecting the oppositely extending rods, and means for simultaneously actuating the toggles to shift the sleeves toward or from each other, of a hub mounted on each end portion of the axle and having an annular flange, tubular spokes radiating from the flange, a rim at the outer ends of the spokes and having a peripheral groove, arcuate plates normally seated upon the inner wall of the groove, transverse grouters upon said plates, stems fixedly connected to the plates and extending inwardly through the spokes, toggle links connecting the inner ends of the stems to the sleeves.

In testimony that I claim the foregoing as my own, I have hereto affixed my signature in the presence of two witnesses.

CHARLES POWELL.

Witnesses:
JAMES CLINE,
J. F. TODD.

Copies of this patent may be obtained for five cents each, by addressing the "Commissioner of Patents, Washington, D. C."